(12) United States Patent
Wilson et al.

(10) Patent No.: US 11,667,585 B2
(45) Date of Patent: Jun. 6, 2023

(54) CERAMIC SUBSTRATE WITH GLASS FILL FOR DECORATION AND HOUSING MATERIALS

(71) Applicant: Apple Inc., Cupertino, CA (US)

(72) Inventors: James R. Wilson, Cupertino, CA (US); Andi M. Limarga, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 1164 days.

(21) Appl. No.: 16/262,776

(22) Filed: Jan. 30, 2019

(65) Prior Publication Data

US 2020/0087219 A1 Mar. 19, 2020

Related U.S. Application Data

(60) Provisional application No. 62/733,603, filed on Sep. 19, 2018.

(51) Int. Cl.

| | | |
|---|---|---|
| *C04B 41/83* | (2006.01) | |
| *B28B 1/00* | (2006.01) | |
| *C04B 41/48* | (2006.01) | |
| *B33Y 80/00* | (2015.01) | |
| *C04B 41/00* | (2006.01) | |
| *B33Y 10/00* | (2015.01) | |
| *B32B 18/00* | (2006.01) | |
| *B33Y 40/20* | (2020.01) | |
| *C04B 35/111* | (2006.01) | |
| *C04B 35/486* | (2006.01) | |
| *C04B 41/50* | (2006.01) | |

(52) U.S. Cl.
CPC .............. *C04B 41/83* (2013.01); *B28B 1/001* (2013.01); *B32B 18/00* (2013.01); *B33Y 10/00* (2014.12); *B33Y 40/20* (2020.01); *B33Y 80/00* (2014.12); *C04B 35/111* (2013.01); *C04B 35/486* (2013.01); *C04B 41/009* (2013.01); *C04B 41/48* (2013.01); *C04B 41/5022* (2013.01)

(58) Field of Classification Search
CPC ....... C04B 41/83; C04B 41/48; C04B 41/009; B28B 1/001; B33Y 80/00
USPC .......................................................... 428/688
See application file for complete search history.

(56) References Cited

U.S. PATENT DOCUMENTS

2006/0128547 A1 6/2006 Takada et al.
2018/0186058 A1* 7/2018 Büsgen ................ B33Y 80/00

FOREIGN PATENT DOCUMENTS

| CN | 1796322 | A | 7/2006 | |
|---|---|---|---|---|
| CN | 1816502 | A | 8/2006 | |
| CN | 1949420 | A | 4/2007 | |
| CN | 101268725 | A | 9/2008 | |
| CN | 103002078 | A | 3/2013 | |
| CN | 103297565 | A | 9/2013 | |
| CN | 203976648 | U | 12/2014 | |
| CN | 106957183 | A | 7/2017 | |
| CN | 107683045 | A | 2/2018 | |
| CN | 107787271 | A | 3/2018 | |
| CN | 107921744 | A | 4/2018 | |
| CN | 108484218 | A * | 9/2018 | ......... C04B 41/5022 |
| CN | 108484218 | A | 9/2018 | |
| WO | 2015152632 | A1 | 10/2015 | |
| WO | 2018148216 | A1 | 8/2018 | |

OTHER PUBLICATIONS

Translation of CN 108484218, Sep. 4, 2018. (Year: 2018).*

* cited by examiner

*Primary Examiner* — Hui H Chin
(74) *Attorney, Agent, or Firm* — Dorsey & Whitney LLP

(57) ABSTRACT

A ceramic composite article includes a substrate including a matrix of ceramic material defining a network of interstitial regions and a transparent material occupying at least some of the interstitial regions of the substrate. The transparent material can have a melting point lower than a melting point of the ceramic material. The matrix of ceramic material can be formed by a 3D printing process.

20 Claims, 13 Drawing Sheets

CERAMIC SUBSTRATE WITH GLASS FILL FOR DECORATION AND HOUSING MATERIALS

CROSS-REFERENCE TO RELATED APPLICATION(S)

This application claims priority to U.S. Provisional Patent Application No. 62/733,603, filed 19 Sep. 2018, and entitled "Ceramic Substrate with Glass Fill for Decoration and Housing Materials," the entire disclosure of which is hereby incorporated by reference.

FIELD

The described embodiments relate generally to composite articles for electronic devices. More particularly, the present embodiments relate to ceramic composite articles for electronic devices and methods of forming the same.

BACKGROUND

Electronic devices are widespread in society and can take a variety of forms, from wristwatches to computers. Electronic devices, including portable electronic devices such as handheld phones, tablet computers, and watches, can experience contact with various surfaces while in use. Further, the use, transportation, and storage of such devices can exert mechanical and thermal stresses on the devices.

Components for these devices, such as housings, can thus benefit from exhibiting different combinations of properties relating to the use of the device. A housing for a portable electronic device can have a combination of properties such as strength, appearance, toughness, abrasion resistance, electromagnetic shielding, cost, and the like, in order for the device to function as desired. Certain materials can provide a desired level of performance with respect to some properties, but not others. For example, a metal housing can be strong and tough, but can provide varying levels of electromagnetic shielding. Similarly, a glass housing can be abrasion resistant and electromagnetically transparent, but can have lower levels of strength and toughness. Ceramic materials can be more abrasion resistant and stronger than glass, but can have less desirable electromagnetic shielding properties and can be more expensive to form and machine. Other materials can provide different combinations of properties.

SUMMARY

One aspect of the present disclosure relates to a ceramic composite housing of an electronic device, including a substrate with a matrix of ceramic material defining a network of interstitial regions and a transparent material occupying at least some of the interstitial regions of the substrate. The transparent material can have a melting point lower than a melting point of the matrix of ceramic material.

In some embodiments, the substrate including the matrix of ceramic material can include a repeating three-dimensional pattern defining the network of interstitial regions and extending substantially across a height, width, and depth of the housing. The transparent material can be glass and can substantially fill the network of interstitial regions defined by the matrix of ceramic material such that the resulting ceramic composite housing is a substantially solid body. The substrate including the matrix of ceramic material can extend substantially across one or more of an entire height, width, or depth of the housing. The transparent material can completely surround the substrate including the matrix of ceramic material. An exterior surface of the ceramic composite housing can include the matrix of ceramic material and the transparent material. The substrate including the matrix of ceramic material can include one or more of zirconia and alumina. The transparent material can include an amorphous material or a polymer material. A coefficient of thermal expansion of the ceramic material can be within about 10% of a coefficient of thermal expansion of the transparent material. The melting point of the transparent material can be more than about 100° C. lower than the melting point of the ceramic material.

Another aspect of the present disclosure relates to a ceramic composite article of an electronic device that can include a substrate including a matrix of ceramic material and an infill material occupying at least a portion of the matrix of ceramic material. The infill material occupying at least a portion of the matrix of ceramic material can have a melting point lower than a melting point of the ceramic material. In some embodiments, the substrate including the matrix of ceramic material can be a 3D printed ceramic form. The infill material occupying at least a portion of the matrix of ceramic material can be substantially transparent. The portion of the matrix of ceramic material occupied by the infill material can include one or more apertures, cavities, interstices, or recesses defined by the matrix of ceramic material.

Another aspect of the present disclosure relates to a method for forming a ceramic composite article of an electronic device. In some embodiments, the method can include producing a substrate including a matrix of ceramic material and infilling a substantially transparent material into a network of interstitial regions defined by the matrix of ceramic material. The substantially transparent material can have a melting point lower than a melting point of the ceramic material.

In some embodiments, producing the substrate including the matrix of ceramic material can include 3D printing the matrix of ceramic material. 3D printing the matrix of ceramic material can include 3D printing a green body with a ceramic-based slurry and sintering the green body to produce the matrix of ceramic material. Infilling the substantially transparent material into the matrix can include providing the substantially transparent material in a moldable form into the network of interstitial regions defined by the matrix of ceramic material and solidifying the moldable transparent material within the network of interstitial regions defined by the matrix of ceramic material to form the ceramic composite article. Providing the substantially transparent material in a moldable form can include providing molten substantially transparent material into the network of interstitial regions defined by the matrix of ceramic material. Solidifying the moldable transparent material can include cooling the molten substantially transparent material to form the ceramic composite article. Providing the substantially transparent material in a moldable form can also include providing a powder of the substantially transparent material on or into the network of interstitial regions defined by the matrix of ceramic material and melting the powder to form molten substantially transparent material. Solidifying the moldable substantially transparent material can include cooling the molten substantially transparent material to form the ceramic composite article. Solidifying the moldable substantially transparent material can include curing the moldable substantially transparent material to form the ceramic composite article.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
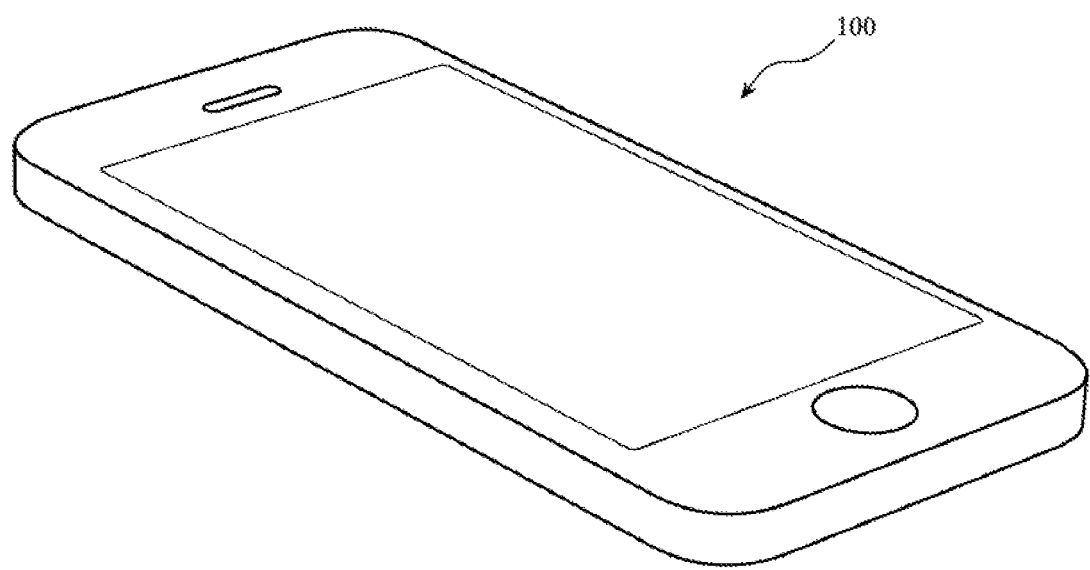
FIG. 1 shows a perspective view of an electronic device.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, methods described can be performed in an order different from that described, and various steps can be added, omitted, or combined. Also, features described with respect to some embodiments can be combined in other embodiments.

The present description provides methods, housings, and other articles of manufacture that include ceramic composites, including a ceramic substrate and a second material, such as glass, occupying select portions (e.g., voids, interstitial areas, etc.) of the substrate. These ceramic composites can be designed to exhibit the beneficial characteristics of ceramic and glass materials, while significantly reducing or eliminating the potential downsides associated with each material. Ceramic composites, such as those disclosed herein, solve the issues associated with using a single material for articles of electronic devices. That is, different materials can provide different advantages for certain applications. For example, a ceramic material can be strong and aesthetically pleasing, but can be relatively expensive. A glass material can be relatively inexpensive, but can be brittle and prone to cracking.

Furthermore, a housing made entirely of ceramic material can be very expensive to produce in a desired form factor, and can require many hours of grinding and machining to achieve the final structure. If the housing includes complicated geometries, the housing may chip while these geometries are being formed, requiring the part to be scrapped and adding further to manufacturing costs. A housing made entirely of glass, on the other hand, can be relatively inexpensive, but might not be strong or durable enough to function effectively as a housing. For example, a glass housing may crack or shatter if dropped, and can become scratched during everyday use.

In contrast, ceramic composite housings including a ceramic substrate and a second material, such as glass, occupying select portions (e.g., voids, interstitial areas, etc.) of the substrate can be designed to exhibit the beneficial characteristics of ceramic and glass materials while significantly reducing or eliminating the potential downsides associated with each material. The structure of the ceramic substrate can be designed to use a significantly smaller amount of ceramic material as compared to a solid ceramic housing, thereby drastically reducing costs and manufacturing time. Even with this reduced amount of ceramic material, the ceramic substrate can be designed to use the high strength and durability of the ceramic to reinforce specific areas of the housing that are likely to experience high stresses. For example, housings often fail when they are dropped on a corner. Thus, a ceramic composite substrate can be designed to mechanically reinforce these impact prone areas of the housing. Accordingly, the resulting ceramic composite housing can be manufactured at a lower cost than a solid ceramic housing, but can also exhibit significantly higher strength than an entirely glass housing.

The ceramic substrate can similarly be designed to enhance a number of other mechanical characteristics of the housing. For example, the ceramic substrate can have a design that includes a number of ceramic structures that span the housing in one or more directions. Such a structure can include a matrix of ceramic material that defines a fillable portion or portions of the ceramic substrate. These ceramic structures can enhance the resistance of the glass material to bending or flexure, thereby providing a housing that is much stronger and stiffer than an entirely glass housing. In another example, the surface of the housing can include both the ceramic substrate material and the glass that is occupying portions of the ceramic substrate. The ceramic material has a much higher hardness than the glass and can provide for greatly enhanced scratch resistance.

The designs of the ceramic substrate structure can be produced by 3D printing the ceramic substrate. This ceramic 3D printing process allows for highly complicated and intricate designs that, in many cases, cannot be reproduced by any other process for forming ceramic materials. Accordingly, the design of the ceramic substrate, and thus the housing, can be finely tailored to any desired use and to enhance any desired mechanical property in various select orientations. Further, these complex or intricate ceramic substrate designs may be visually interesting or appealing to a user of an electronic device. In cases where the occupying material is glass, for example, the transparent nature of the glass allows the user to visualize the ceramic substrate in the housing. This can produce an extremely pleasing visual effect for the user. In fact, the ceramic substrate can be specifically designed to include ornamental structures or features in addition to providing mechanical or other benefits. For example, a ceramic substrate designed to enhance the strength of certain regions of the housing can include ceramic material at each corner of the housing, but the shape of the ceramic substrate in other areas of the housing might not be as important to achieving the desired structural functionality. Thus, the ceramic substrate in these portions can have a highly complicated and visually interesting design, such as a repeating pattern of intricate structures. Further, because the ceramic substrate can be 3D printed, the manufacturing of these ornamental structures does not result in large increases in cost or manufacturing time.

The articles for electronic devices described herein, such as housings, can include a ceramic substrate with a second, different infill material occupying or surrounding at least a portion of the ceramic substrate. The infill material can have a melting point or a glass-liquid transition temperature lower than the melting point of the ceramic substrate. For example, the melting point of the material can be at least about 100° C. lower than the melting point of the ceramic substrate. Additionally, the ceramic substrate can have a coefficient of thermal expansion that is within about 10% of the coefficient of thermal expansion of the infill material.

The ceramic substrate can include any ceramic material, such as zirconia or alumina. The second, different material can be a metallic material, an amorphous material such as glass, a polymeric material, and the like. The second, different material can be a substantially transparent material and can allow for visualization of the ceramic substrate through the transparent material.

The ceramic substrate can assume any shape and can include one or more fillable structures or geometries that are at least partially occupied by the infill material. The ceramic substrate can include a matrix of ceramic material having one or more fillable structures such as apertures, cavities, recesses, interstices, and combinations thereof. The ceramic substrate can have a regular or repeating structure including gaps or openings that are at least partially filled with the infill material. Alternatively, the ceramic substrate can have a random or irregular structure that includes gaps or openings that are at least partially filled with the infill material.

Also described herein are methods for forming ceramic composite articles for electronic devices. For example, in some cases, a method for forming a ceramic composite article can include producing a ceramic substrate and infilling a material having a melting point lower than a melting point of the ceramic into the ceramic substrate.

The ceramic substrate can be a 3D printed ceramic substrate and can take on any shape capable of being formed by a ceramic 3D printing process. The infill material can be provided in a moldable form to the ceramic substrate to infill and occupy at least a portion of the substrate. In some cases, the infill material can fully occupy any fillable structure of the ceramic substrate. The infill material can be provided to the ceramic substrate in molten form, whereupon it can flow into the ceramic substrate (e.g., into a network of interstitial regions that in some cases are in fluid communication with each other within the matrix of ceramic material). In some embodiments, the infill material can be provided to the ceramic substrate as a powder and can be melted while occupying at least a portion of the ceramic substrate. In other embodiments, the infill material can be provided in liquid form and can be cured to form the ceramic composite article.

In yet other embodiments, the infill material can be provided as two or more separate materials that are combined to form the infill material occupying at least a portion of the ceramic substrate.

Although one or more of these components and/or processes can be described in the context of handheld devices, such as mobile phones, laptops, and notebooks, the embodiments disclosed herein should not be interpreted or otherwise used as limiting the scope of the disclosure, including the claims. In addition, the following description has broad application. Accordingly, the discussion of any embodiment is meant only to be exemplary and is not intended to suggest that the scope of the disclosure, including the claims, is limited to these embodiments.

These and other embodiments are discussed below with reference to FIGS. 1-16. However, the detailed description given herein with respect to these Figures is for explanatory purposes only and should not be construed as limiting.

FIG. 1 shows an example electronic device 100 in the form of a mobile phone, such as a smartphone, that can include a housing or other components including or formed from a ceramic composite materials, as discussed herein. The electronic device 100 can, correspond to a portable media player, a media storage device, a portable digital assistant ("PDA"), a tablet computer, a computer, a mobile communication device, a GPS unit, a remote control device, and the like. The electronic device 100 can be referred to as an electronic device, or a consumer device. Exemplary structures and components of the example electronic device 100 are described in detail below, with reference to FIG. 2.

Figure 2:
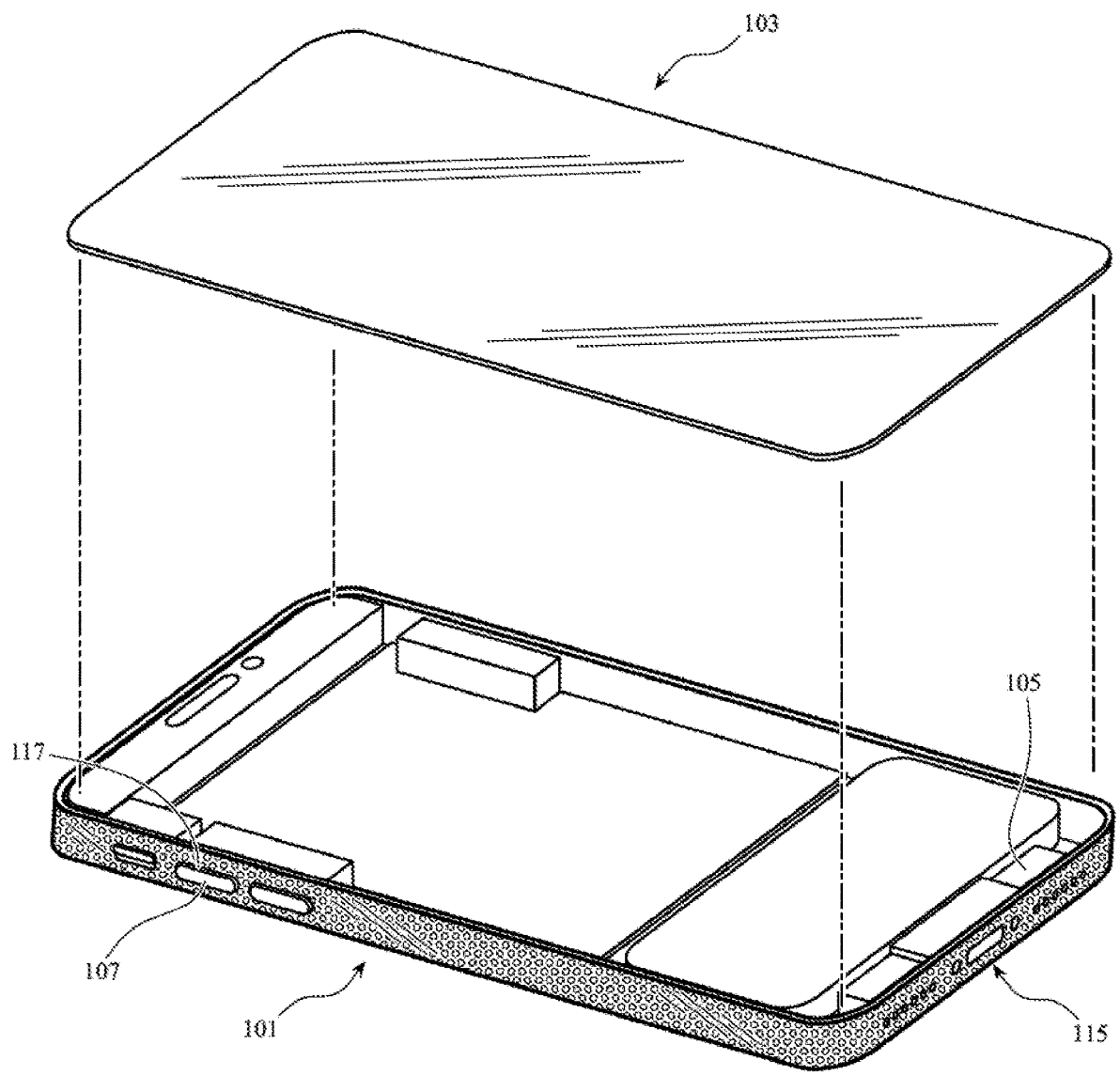
FIG. 2 shows an exploded view of the electronic device of FIG. 1.

Referring now to FIG. 2, the electronic device 100 can including a housing 101 and a cover 103 attached to the housing 101. The housing 101 can substantially define at least a portion of an exterior surface of the device 100. The cover 103 can include glass, plastic, or any other substantially transparent material, component, or assembly. The cover 103 can cover or otherwise overlay a display, a camera, a touch sensitive surface such as a touchscreen, or other component of the device 100. The cover 103 can define a front exterior surface of the device 100. Together, the housing 101 and the cover 103 can substantially define the exterior surface of the device 100.

The device 100 can also include internal components, such as processors, memory, circuit boards, batteries, sensors, and the like. Such components can be disposed within an internal volume defined at least partially by the housing 101, and can be affixed to the housing 101 via internal surfaces, attachment features, threaded connectors, studs, posts, and the like, that are formed into, defined by, or otherwise part of the housing 101 and/or the cover 103.

Additionally or alternatively, other components of the electronic device 100, such as individual internal structural components or exterior input components, can be formed from or can include a ceramic composite article as described herein. The ceramic composite article, such as a ceramic composite article forming the housing 101, can include a ceramic substrate and an infill material occupying at least a portion of the ceramic substrate. The infill material can have a melting point lower than the melting point of the ceramic substrate. In some embodiments, the infill material can be a substantially transparent material. In some embodiments the infill material can be a polymer material, a metal material, an amorphous material such as glass, or combinations thereof.

The ceramic composite article forming the housing 101 or other component of the device 100 can be continuous and include one or more openings to receive components of the electronic device 100 and/or provide access to an internal portion of the electronic device 100. For example, the electronic device 100 can include one or more audio speakers 105, and the housing 101 can provide one or more openings 115 that provide a pathway for sound emitted from the speaker 105. In a further example, the electronic device 100 can include one or more buttons 107, and the housing 101 can provide one or more openings 117 for receiving the buttons 108. A variety of other openings can be provided for access or communication.

The device 100 of FIGS. 1 and 2 is merely one example of an electronic device 100 that can include a ceramic composite article. For example, the housing 101 can include a ceramic composite article. In some cases, the device 100 can include other components including or formed from a ceramic composite article. For example, the device 100 can include components such as a stiffener, frame, and the like that are formed from or can include a ceramic composite component as described herein. Additional electronic devices and designs thereof, including one or more ceramic composite articles as discussed herein, are expressly contemplated.

Figure 3:
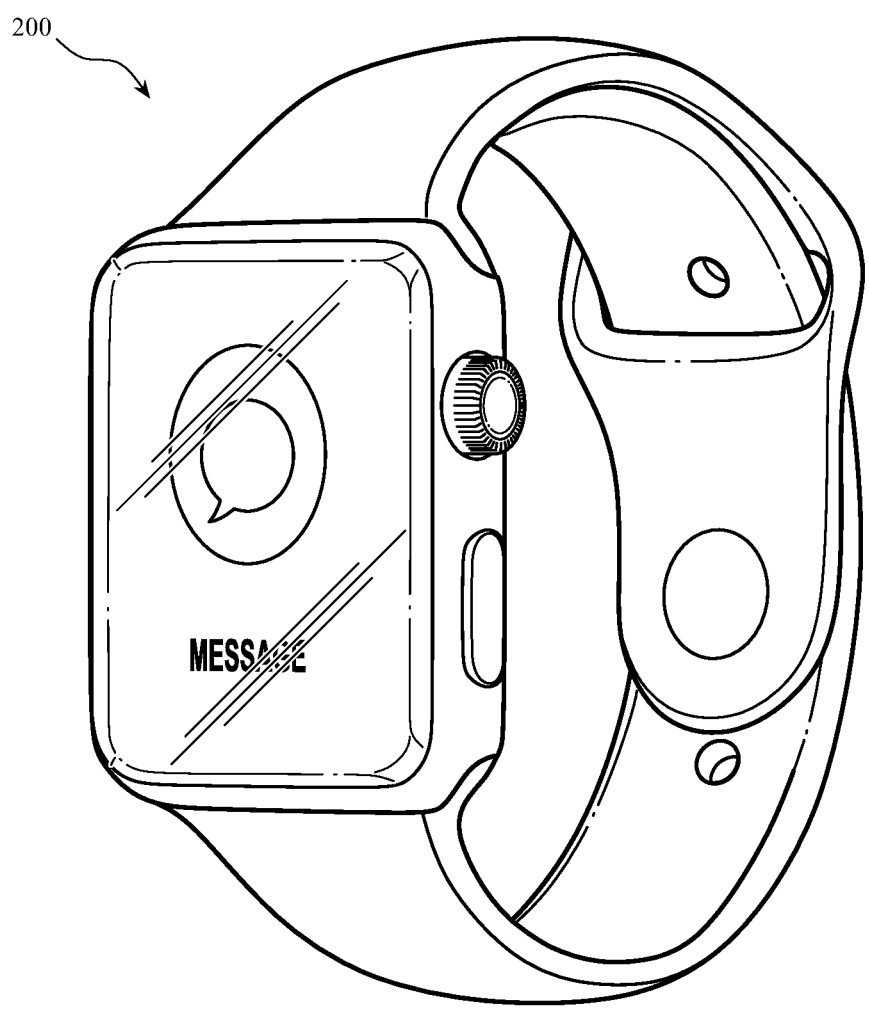
FIG. 3 shows a perspective view of an electronic device.

For example, FIG. 3 shows another embodiment of an electronic device 200. The electronic device shown in FIG. 3 is a watch, such as a smartwatch. The smartwatch of FIG. 3 is merely one representative example of a device that can be used in conjunction with the systems and methods disclosed herein. As described with respect to electronic device 100, electronic device 200 can correspond to any form of wearable electronic device, a portable media player, a media storage device, a portable digital assistant ("PDA"), a tablet computer, a computer, a mobile communication device, a GPS unit, a remote control device, and the like. The electronic device 200 can be referred to as an electronic device, or a consumer device. Further details of the watch is provided below with reference to FIG. 4.

Figure 4:
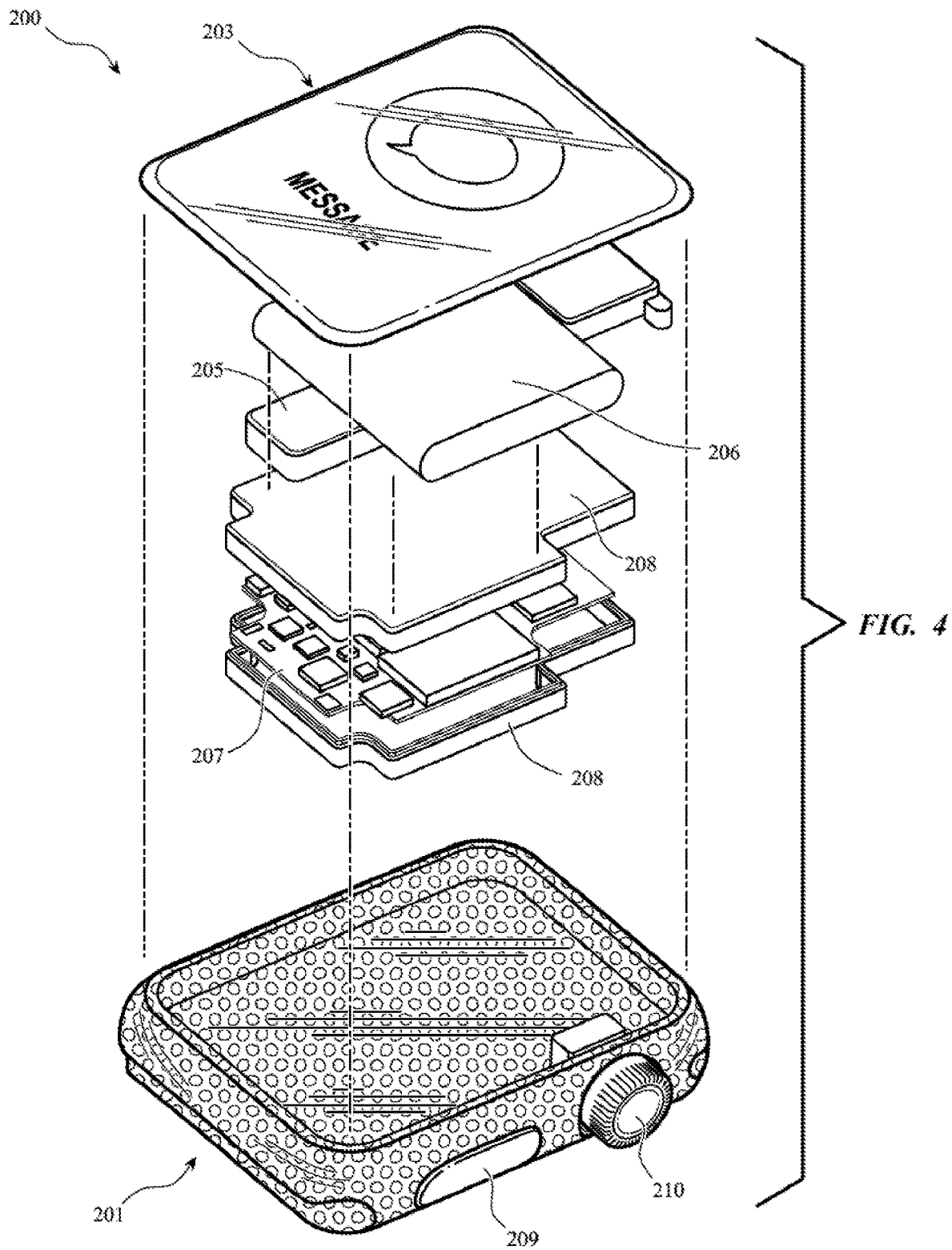
FIG. 4 shows an exploded view of the electronic device of FIG. 3.

Referring now to FIG. 4, the electronic device 200 can include a housing 201, and a cover 203 attached to the housing. The housing 201 can substantially define at least a portion of an exterior surface of the device 200. The cover 203 can include glass, plastic, or any other substantially transparent material, component, or assembly. The cover 203 can cover or otherwise overlay a display, a camera, a touch sensitive surface, such as a touchscreen, or other component of the device 200. The cover 203 can define a front exterior surface of the device 100. Together the housing 201 and the cover 203 can substantially define the exterior surface of the device 200.

As with the housing 101 of electronic device 100, the housing 201 can be formed from or can include a ceramic composite article as described herein. The ceramic composite article, such as a ceramic composite article forming the housing 201, can include a ceramic substrate and an infill material occupying at least a portion of the ceramic substrate. The infill material can have a melting point lower than the melting point of the ceramic substrate. In some embodiments, the infill material can be a substantially transparent material. In some embodiments the infill material can be a polymer material, a metal material, or an amorphous material, such as glass, or combinations thereof.

The ceramic composite article forming the housing 201 or other component of the device 200 can be continuous or can include one or more openings to receive components of the electronic device 200 and/or provide access to an internal portion of the electronic device 200.

Additionally, other components of the electronic device 200, can be formed from or can include a ceramic composite article as described herein. In some embodiments, for example, the device 200 can include input components such as one or more buttons 209 and/or a crown 210 that can be formed from a ceramic composite or include a ceramic composite article. The ceramic composite article can provide for strong and durable input components 209, 210 as discussed herein. Further, the ceramic composite article can result in input components 209, 210 that can have an aesthetically pleasing look and feel for the user.

The device 200 can also include internal components, such as a haptic engine 205, battery 206, and system in package (SiP), including one or more integrated circuits 207, such as processors, sensors, and memory. The SiP can also include a package 208. All or a portion of one or more internal components, for example the package 208 of the SiP, can be formed from or include a ceramic composite article. In some embodiments, the ceramic composite article can allow for one or more of such internal components to be extremely light, durable, and strong, as discussed herein. Further, the design of such components can be smaller compared to a similar component that does not include a ceramic composite article, and can allow for component architectures that may not have previously been able to be achieved.

The internal components, such as one or more of components 205, 206, 207, 208, can be disposed within an internal volume defined at least partially by the housing 201 and can be affixed to the housing 201 via internal surfaces, attachment features, threaded connectors, studs, posts, and the like, that are formed into, defined by, or otherwise part of the housing 201 and/or the cover 203.

The housing 201 formed from a ceramic composite article can be conformable to interior dimensional requirements as defined by the internal components 205, 206, 207, 208. For example, in some cases, the structure of the housing 201 including a ceramic composite article can be defined or limited exclusively or primarily by the internal components the housing is designed to accommodate. That is, because a housing 201 formed from a ceramic composite article can be extremely light and strong, the housing 201 can be shaped to house the interior components 205, 206, 207, 208 in a dimensionally efficient manner without being constrained by factors other than the dimensions of the components, such as the need for additional structural elements.

The ceramic composite article of the housing 201 can also be formed by a variety of processes, for example 3D printing, as discussed herein. In some embodiments, these formation processes can allow of the housing 201 to have a detailed shape or design that is tailored specifically to satisfy one or more needs, such as internal dimensional requirements, without the need for additional structures or features to reinforce the structure of the housing or that are artifacts of the manufacturing process of the housing.

While any number or variety of components of an electronic device, for example electronic device 200, can be formed from or can include a ceramic composite article, the structure of these ceramic composite articles can be, for example, a ceramic composite article including a ceramic substrate and an infill material occupying at least a portion of the substrate. The structure and materials of the ceramic substrate and infill material, and of the ceramic composite article itself, can apply not only to the specific examples discussed herein, but to any number or variety of embodiments. Various embodiments of ceramic composite articles are described below with reference to FIGS. 5A-5D.

Figure 5A:
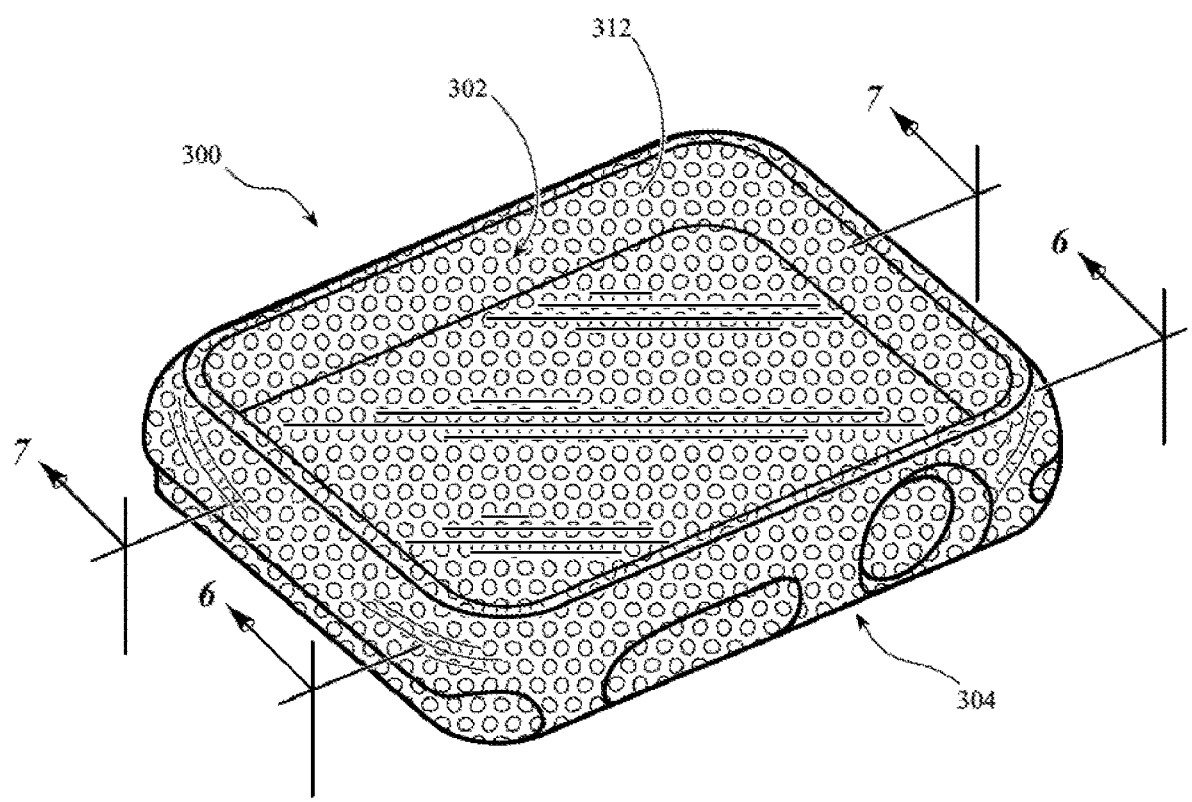
FIG. 5A shows a perspective view of a ceramic composite article.

FIG. 5A shows an example ceramic composite article 300, according to the present disclosure. The ceramic composite article 300 includes a ceramic substrate 302 and an infill material 304 occupying at least a portion of the ceramic substrate 302 (e.g., occupying one or more interstitial regions formed in the matrix of ceramic material). In some embodiments, the infill material may also cover an exterior surface of the ceramic substrate. The infill material 304 occupying (and, optionally, covering) the ceramic substrate 302 has a melting point lower than the melting point of the ceramic substrate 302. In some embodiments, the infill material 304 can be substantially transparent. Thus, in some embodiments, and as shown in FIG. 5A, the infill material 304 can allow for the ceramic substrate 302 to be visualized through the infill material 304.

Figure 5B:
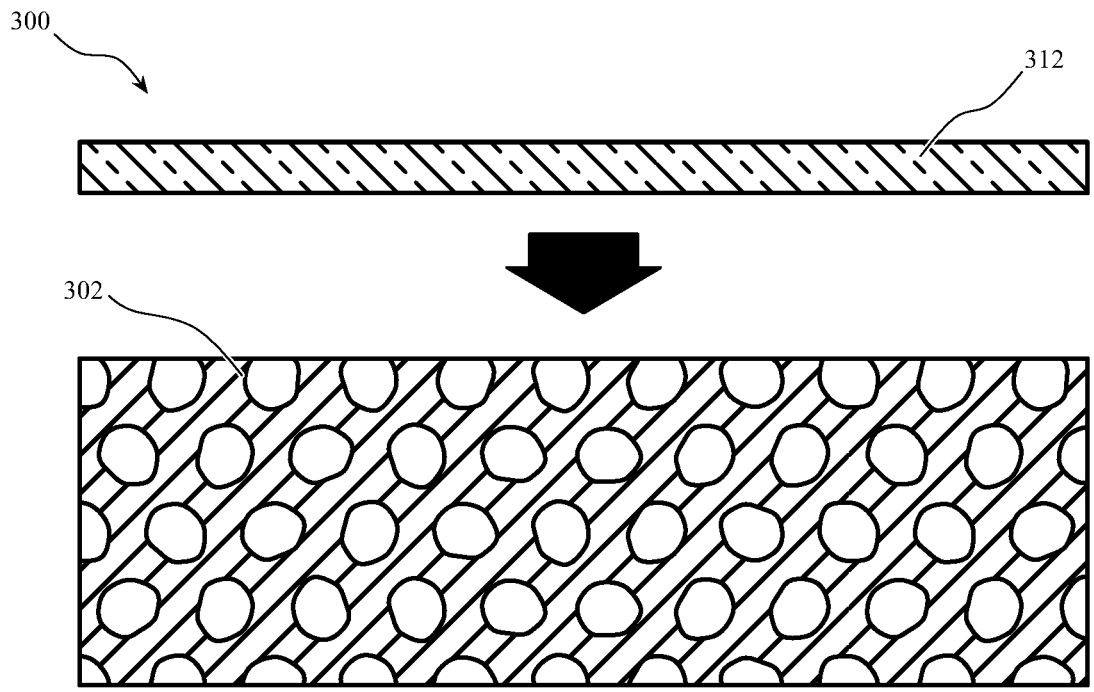
FIG. 5B shows a close-up view of a ceramic substrate of the ceramic composite article of FIG. 5A.

As shown in FIG. 5B, the ceramic substrate 302 can be a three-dimensional ceramic substrate 302, that is, the ceramic substrate 302 can include a matrix of ceramic material defining one or more three-dimensional structures or features 312. In some embodiments, the ceramic substrate 302 can include a matrix of ceramic material defining a number of cavities, interstices, apertures, or recesses. In some embodiments, the matrix of ceramic material can define a network of fillable structures 312, for example a network of voids, interstitial regions, apertures, cavities, and the like. The voids, interstitial regions, apertures, cavities, etc. can be in fluid communication with each other within the matrix of ceramic material.

Figure 5C:
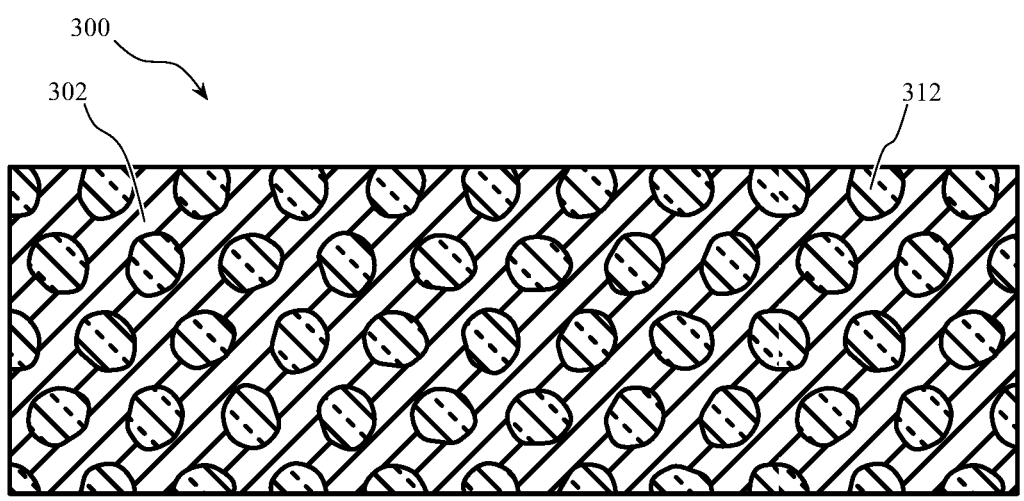
FIG. 5C shows a close-up view of an infill material occupying portions of the ceramic substrate of the ceramic composite article of FIG. 5A.

As shown in FIG. 5C, and in some embodiments, one or more fillable structures or features 312, for example, as defined by a matrix of ceramic material of substrate 302, can be filled by the infill material 304 as described herein. For example, in some embodiments where the fillable structures 312 include a network of interstitial regions defined by a matrix of ceramic material, the infill material 304 can be caused to flow through the network to thereby occupy at least a portion of the matrix of ceramic material. Other methods of infilling the fillable structures 312 of the ceramic substrate 302 with the infill material 304 are expressly contemplated and are discussed further herein. In some embodiments, the infill material 304 can occupy substantially all of the fillable structures 312 of the ceramic substrate 302. In some embodiments, however, the infill material 304 may only partially occupy or fill some or all of the fillable structures 312 of the ceramic substrate 302.

The ceramic substrate 302 can be produced by, for example, a 3D printing process. Thus, the ceramic substrate 302, for example including a matrix of ceramic material, can be a 3D printed ceramic substrate 302. The ceramic substrate 302 can include an aesthetically pleasing design, or aesthetically pleasing structures 312. The aesthetically pleasing design can include additional structures or features that may not be necessary to achieve a desired property or function, such as intricate or ornamental structures.

The ceramic substrate 302 can have a shape, arrangement, configuration, or design that can provide desired properties to the ceramic composite article 300 including the ceramic substrate 302. For example, where the ceramic composite article 300 is a housing for an electronic device, the ceramic substrate 302 can include a matrix of ceramic material having a design that provides additional strength in desired regions of the housing as compared to a housing that does not include a ceramic composite article 300. Furthermore, the ceramic substrate 302 may assume any number of patterns, geometries, or three-dimensional structures. An additional exemplary ceramic substrate structure is described below with reference to FIG. 5D.

Figure 5D:
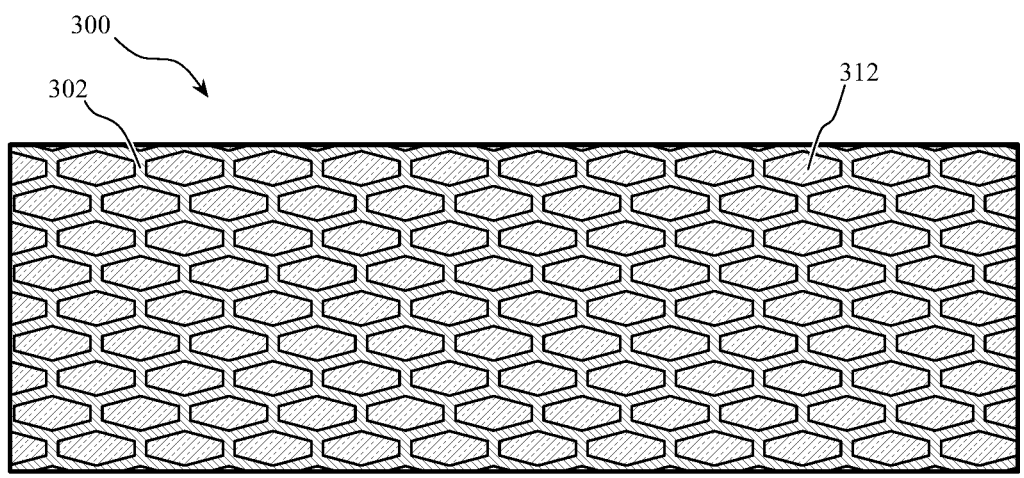
FIG. 5D shows a close-up view of an infill material occupying portions of a ceramic substrate of a ceramic composite article.

FIG. 5D shows an alternative embodiments of a ceramic substrate 302 including the infill material 304 disposed in one or more fillable structures 312. The ceramic substrate shown in FIG. 5D is just one example of a design of a ceramic substrate 302. The ceramic substrate 302 can, for example, include a lattice or honeycomb pattern that can be designed to be extremely strong and/or durable in or more directions. The fillable structures 312 of the ceramic substrate 302 can also be any shape or design as desired, for example to serve a number of purposes such as providing strength, durability, weight reduction, and the like.

In some cases, a housing of an electronic device can benefit from enhanced strength or durability at a corner portion of the housing because that area can be subjected to high stresses when accidentally dropped by a user. In some embodiments where the ceramic composite article 300 is, for example, a housing of an electronic device, the ceramic substrate 302 can have a shape designed to provide enhanced strength, toughness, and/or durability to a specific area of the ceramic composite article 300, such as a corner portion. Such a design can include, for example, a lattice or other framework positioned at a corner portion of the ceramic composite article 300. Similarly, a housing of an electronic device can be subjected to bending or flexure stresses in everyday use. In some embodiments where the ceramic composite article 300 is a housing of an electronic device, the ceramic substrate 302 can include a shape or design that provides enhanced resistance to bending or flexure in one or more directions. Such a ceramic substrate 302 can include one or more elongate members running an entire height, width, and/or depth of the ceramic composite article 300. Further, the presence of the ceramic substrate 302 can allow for a housing, including the ceramic composite article 300, to have a reduced thickness as compared to a housing that does not include a ceramic substrate 302, while achieving similar or even improved resistance to flexure.

In addition to providing enhanced strength, rigidity, toughness, crack resistance, durability, or other structural characteristics to the ceramic composite article 300, the shape of the ceramic substrate 302 can provide for a desired level electromagnetic shielding. Thus, the shape of the ceramic substrate 302 can be designed such that a ceramic composite article 300 can have an improved level of electromagnetic shielding as compared to a similarly shaped article that does not include a ceramic substrate 302 and a material 304. Where the ceramic composite article 300 is a housing of an electronic device, antennas can be positioned inside the housing. The ceramic substrate 302 can have a shape or design that allows the antenna to transmit and/or receive wireless signals with less interference, attenuation, or shielding, than if the housing were constructed entirely of the ceramic material of the ceramic substrate 302.

The infill material 304 can provide structural support to the ceramic substrate 302. Thus, in some embodiments, the ceramic substrate 302 can have a shape or design that includes small and/or delicate structures which can be prone to damage or breakage if used as an article for an electronic device without the infill material 304 occupying the ceramic substrate 302. For example, the ceramic substrate 302 can have a design that is too delicate to effectively function as an article for an electronic device on its own, but which can achieve a desired level of performance when included in the ceramic composite article 300 and at least partially filled with the infill material 304.

The ceramic substrate 302 extends substantially across the entire dimensions of the ceramic composite article 300. While the ceramic substrate 302 can include fillable structures 312 throughout, the height, width, and/or depth of the ceramic substrate 302, the ceramic substrate itself can extend substantially across the entire height, width, and/or depth of the ceramic composite article 300. However, in some embodiments, the ceramic substrate 302 cannot extend entirely across one or more of the height, width, and depth of the ceramic composite article 300. The ceramic substrate 302 can be a unitary body of ceramic material. Alternatively, the ceramic substrate 302 can include multiple discrete ceramic portions that are filled with and joined by the infill material 304 to form the ceramic composite article 300. These embodiments can also be conceived of as including two or more separate or discrete ceramic substrates that are filled and joined by the infill material 304 to form the ceramic composite article 300.

The ceramic material forming the ceramic substrate 302 can be any ceramic material capable of being formed into a desired shape for the ceramic substrate 302. For example, the ceramic substrate 302 can include zirconia, alumina, silicon carbide, yttria, silicon nitride, and combinations thereof. In some embodiments, the ceramic substrate 302 can be yttria stabilized zirconia and/or other zirconia based ceramic materials. In some embodiments, the ceramic substrate 302 can be alumina.

The ceramic substrate 302 can be a naturally occurring color of the ceramic material it is formed from. In some embodiments, however, the ceramic substrate 302 can include one or more different colors. The coloration can be arranged in any pattern as desired, and can be achieved by, for example, providing additives during formation of the ceramic substrate 302, by coloring a surface of the ceramic substrate 302, or by any ceramic coloring process known in the art or developed in the future.

The infill material 304 can be transparent or substantially transparent in some embodiments, and can allow for visualization of the ceramic substrate 302 through the infill material 304. As described herein, the infill material 304 has a melting point lower than the melting point of the ceramic substrate 302. Thus, the infill material 304 can be any material having a lower melting point than the ceramic substrate 302 that is capable of occupying at least a portion of the ceramic substrate 302 (e.g., interstitial regions) as described herein. For example, the infill material 304 can include a metallic material, an amorphous material such as glass, a polymeric material, and the like.

In some embodiments where the infill material 304 is amorphous, the infill material 304 can be glass. The infill material 304 can be, for example, a silica based glass, such as borosilicate glass, alumina silicate glass, soda-lime glass, fused-silica glass, lead-oxide glass, germanium-oxide glass, and the like. In embodiments where the infill material 304 is a silica based glass, the infill material can include any number or amount of additives as desired. In some embodiments where the infill material 304 is an amorphous material, the infill material 304 can be an amorphous metal, also referred to as a metallic glass or glassy metal. In some embodiments, the infill material 304 can be an amorphous ceramic material. The infill material 304 can be any amorphous material having a melting point lower than the melting point of the ceramic substrate 302.

The infill material 304 can be a polymer material. In some embodiments the infill material 304 can include one or more different polymer materials. For example, the infill material 304 can be a polymer material such as polyethylene, polypropylene, polyurethane, polyvinyl chloride, polystyrene, polyester, acrylonitrile, polycarbonate, and the like, or combinations thereof.

To facilitate the formation of the ceramic composite article 300, the infill material 304 has a melting point lower than the melting point of the ceramic substrate 302 so that, in some embodiments, the infill material 304 can be infilled into the ceramic substrate 302 or otherwise made to occupy at least a portion of the ceramic substrate 302 while in a melted or highly viscous state. Accordingly, the infill material 304 can have a melting point that is greater than about 100° C. lower than the melting point of the ceramic substrate 302, greater than about 150° C. lower, greater than about 200° C. lower, greater than about 250° C. lower, or greater than about 300° C., 400° C., 500° C., 750° C., 1000° C. or more lower than the melting point of the ceramic substrate 302.

Where the infill material 304 is an amorphous material, such as a glass, the infill material 304 can have a glass-liquid transition temperature that is less than the melting point of the ceramic substrate 302. Thus, in some cases the infill material 304 can have a melting point that is at or above the melting point of the ceramic substrate 302, but can have a glass-liquid transition temperature that is sufficiently below the melting point of the ceramic substrate to allow the infill material 304 to occupy at least a portion of the ceramic substrate without causing significant degradation or deformation thereto. Thus, while the present disclosure may refer to the melting point of the infill material 304 being lower than the melting point of the ceramic substrate 302, in some embodiments only the glass-liquid transition temperature of the infill material 304 is lower than the melting point of the ceramic substrate.

Further, because the infill material 304 of the ceramic composite article 300 occupies at least a portion of the ceramic substrate 302, it can be important for the infill material 304 and the ceramic substrate 302 to respond similarly to thermal stresses. Thus, in some embodiments, the coefficient of thermal expansion of the ceramic substrate 302 can be within a desired range of the coefficient of thermal expansion of the infill material 304. For example, in some embodiments the coefficient of thermal expansion of the ceramic substrate 302 can be within about 15%, within about 10%, within about 9%, 8%, 7%, 6%, 5%, 4%, 3%, 2%, or 1% or less of the coefficient of thermal expansion of the infill material 304.

The tolerance of the ceramic composite article 300 for a mismatch between the coefficient of thermal expansion of the ceramic substrate 302 and the infill material 304 can also depend on the design and orientation of the ceramic substrate 302 and the infill material 304. For example, in some embodiments, the shape and arrangement of the ceramic substrate 302 and infill material 304 can result in compressive stresses being exerted on the ceramic substrate by the infill material 304 due to a mismatch between coefficients of thermal expansion of the ceramic substrate 302 and the infill material 304. In these embodiments, the coefficient of thermal expansion of the ceramic substrate can be more than about 15% different than the coefficient of thermal expansion of the infill material 304, and the ceramic composite article can still maintain a desired level of structural integrity upon heating.

The materials and structures of the ceramic substrate 302, infill material 304, and ceramic composite article 300 discussed with respect to FIGS. 5A-5D can include any design or shape as desired to serve any number of functions or provide any number of specifically tailored properties. The following example ceramic composite articles illustrate a variety of different embodiments and designs for use in electronic device.

Figure 6:
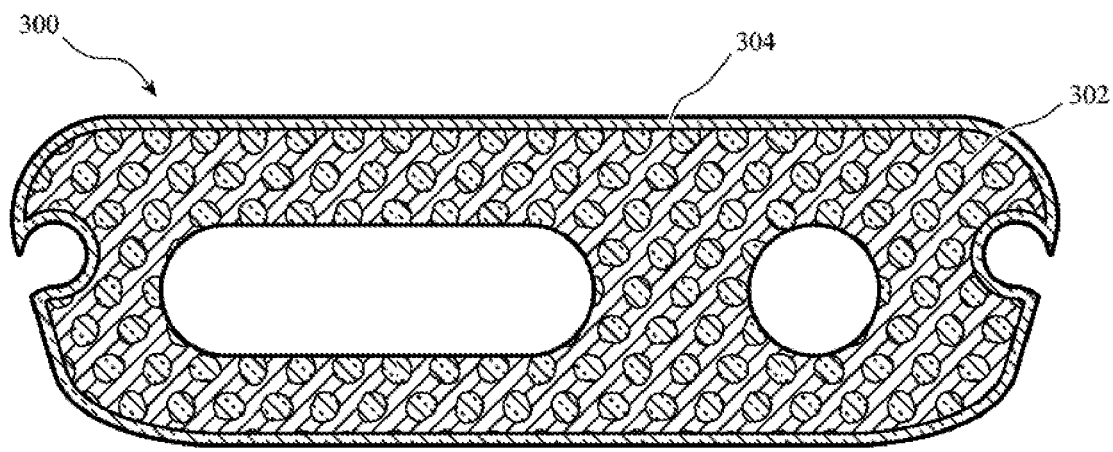
FIG. 6 shows a side view of the ceramic composite article of FIG. 5A.

FIG. 6, for example, shows a side view of the entire structure of the exemplary ceramic composite article of FIG.

5. As can be seen in FIG. 6, in some embodiments the infill material 304 can completely or substantially surround the ceramic substrate 302. That is, in some embodiments, substantially an entire exterior surface of the ceramic composite article 300 can be the infill material 304. The thickness of the infill material 304 surrounding the ceramic substrate 302 can be determined depending on the desired structural or other characteristics of the ceramic composite article 300. For example, in some embodiments, the infill material 304 separating a surface of the ceramic substrate 302 from an exterior surface of the ceramic composite article 300 can be between about 1 micron or less and several millimeters or more.

Figure 7:
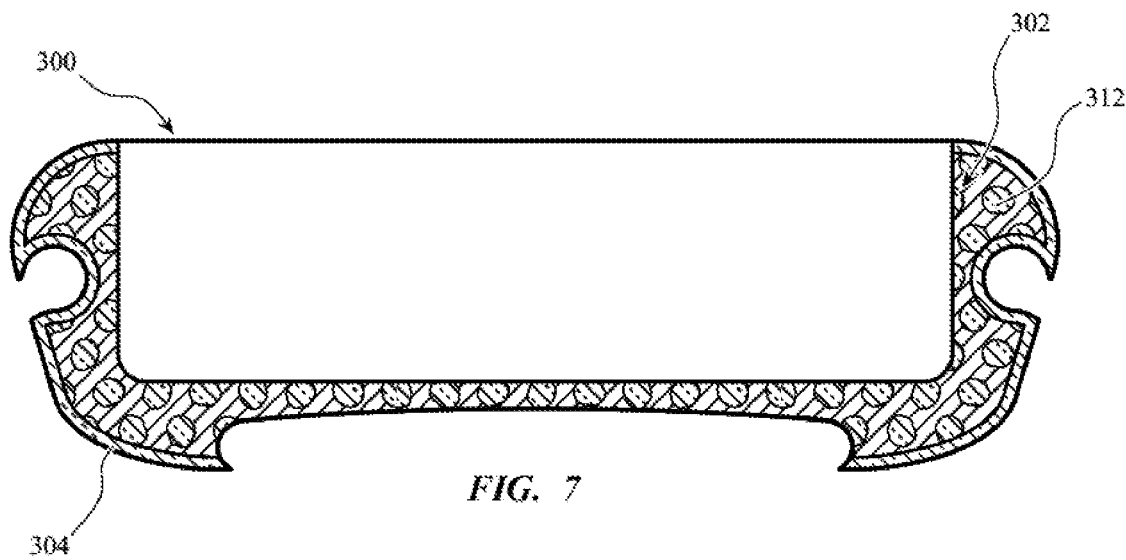
FIG. 7 shows a sectional view of the ceramic composite article of FIG. 5A.

FIG. 7 shows a sectional view of the exemplary ceramic composite article of FIG. 5. The ceramic substrate 302 has a shape that includes a number of fillable structures 312 that are occupied by the infill material 304. The fillable structures 312 of the ceramic substrate 302 can include any number or combination of apertures, interstices (including networked interstices in the ceramic matrix), cavities, recesses, and the like. The ceramic substrate 302 includes a regular or repeating structure, for example as shown in FIG. 7. However, in some other embodiments, the ceramic substrate can include any shape capable of being formed by a ceramic material now or in the future. In some embodiments, the ceramic substrate 302 can include a lattice-type shape, a mesh-type shape, an inverse opal shape, or any other similar or repeating geometry. In some embodiments, the ceramic substrate 302 can have a shape that is only able to be achieved by a ceramic 3D printing process, for example, as shown in FIG. 7.

As illustrated in FIG. 7, the infill material 304 can completely or substantially completely occupy the fillable structures 312 of the ceramic substrate 302. In some embodiments, however, the infill material 304 may not entirely occupy the fillable structures 312 of the ceramic substrate. For example, the infill material 304 can, in some examples, only partially fill one or more fillable structures 312 to a desired level. In some embodiments, air bubbles or other vacancies can be present in the infill material 304 such that an entire volume of a fillable structure 312 is not occupied by the infill material 304.

The fillable structures 312 can range in size from less than a micron, up to several millimeters, or even larger. Further, the ceramic substrate 302 can include fillable structures 312 having a variety of dimensions. For example, the ceramic substrate 302 can include a first set of one or more fillable structures having a major dimension of several millimeters, and a second set of one or more fillable structures having a major dimension of several microns. In some embodiments, the ceramic substrate 302 can include one or more fillable structures 312 that include one or more other fillable structures therein.

The ceramic composite article 300 provides one example of a design that can be used to achieve any number of desired features and properties. Any number of alternative or additional designs of a ceramic composite articles, ceramic substrate, and infill materials can be used to produce structures that achieve the same or a similar desired function, however. These additional or alternative embodiments can have a number of different advantages as will be understood by the following discussion.

Figure 8:
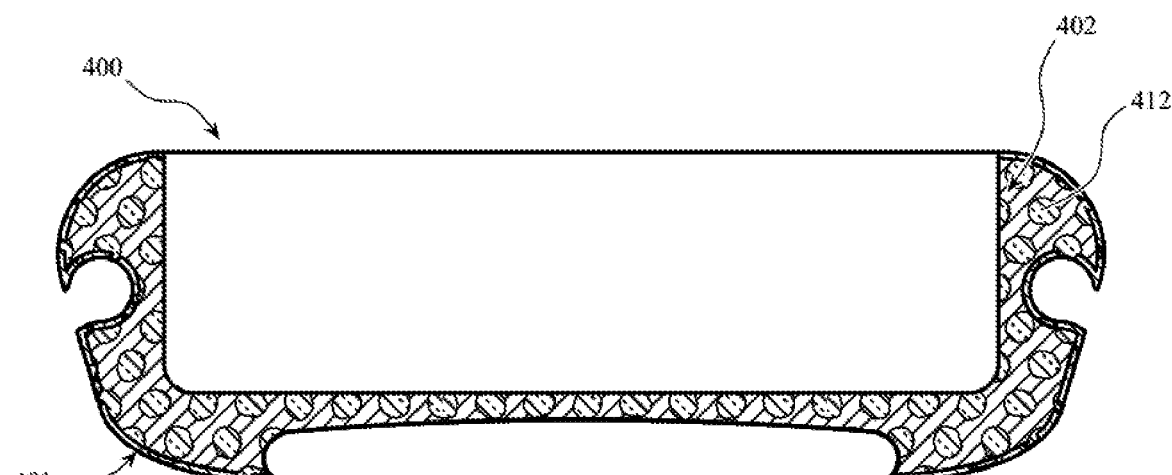
FIG. 8 shows a sectional view of a ceramic composite article.

FIG. 8 shows a sectional view of an exemplary ceramic composite article 400 having an exterior surface that includes both the ceramic substrate 402 and the infill material 404. Thus, while the infill material 404 occupies at least a portion of the ceramic substrate 402 (e.g., the interstitial regions of the ceramic matrix), the infill material 404 also covers or surrounds a portion of, but does not completely surround or envelop the entirety of, the ceramic substrate 402. This arrangement of the ceramic composite article 400 can result in an aesthetically pleasing appearance for the user where the exterior surface 401 includes the materials of the ceramic substrate 402 and the infill material 404. Further, the ceramic substrate 402 can have a design that provides for desired structural or other characteristics of the ceramic composite article 400 while providing an aesthetically pleasing exterior surface appearance 401.

Figure 9:
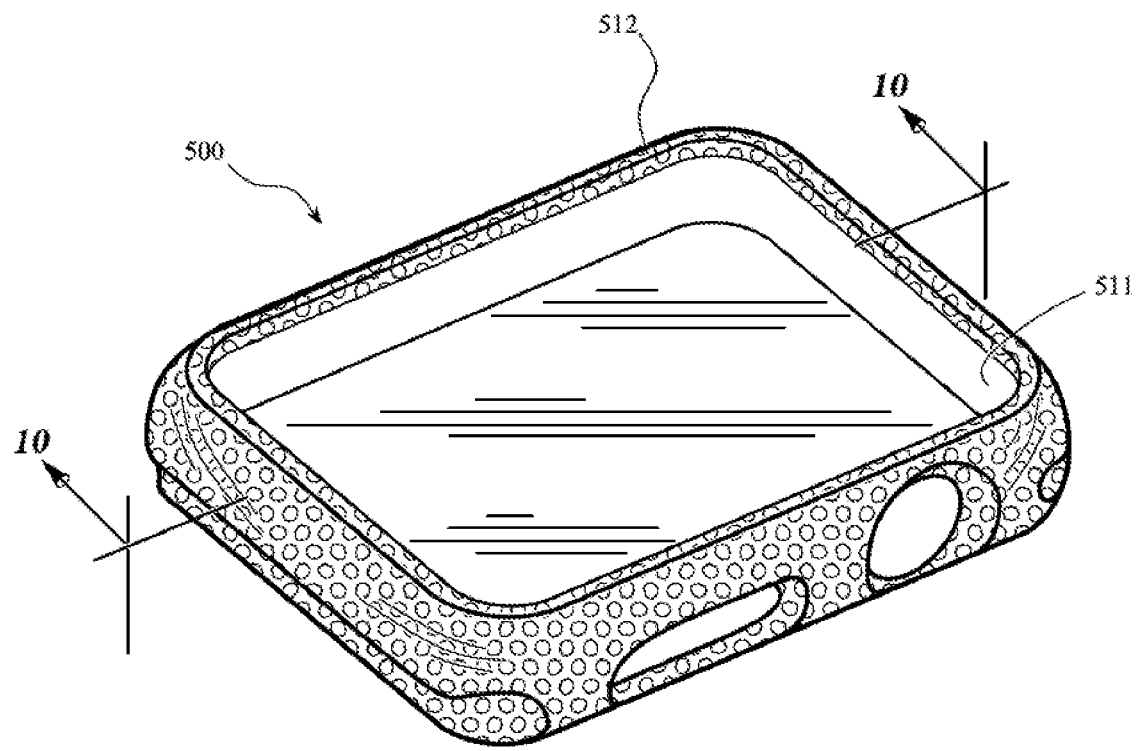
FIG. 9 shows a perspective view of a ceramic composite article.

Referring now to FIG. 9, a ceramic composite article 500 can include a ceramic substrate 502 that includes a substantially solid bulk region 511 with one or more structures 512 present thereon. The structure 512 can cooperate to form one or more fillable structure 512, for example as described herein, with respect to FIG. 5. In some embodiments, the structure 512 can include any number of apertures, cavities, recesses, protrusions, grooves, channels, or the like. The fillable structures 512 can be integrally formed with (or defined by) the ceramic substrate 502 such that the bulk region 511 and the one or more structures 512 are a unitary body. In some other embodiments, however, the fillable structures 512 can be printed, etched, machined, or otherwise formed in or on a surface of the bulk region 511 of the ceramic substrate.

Figure 10:
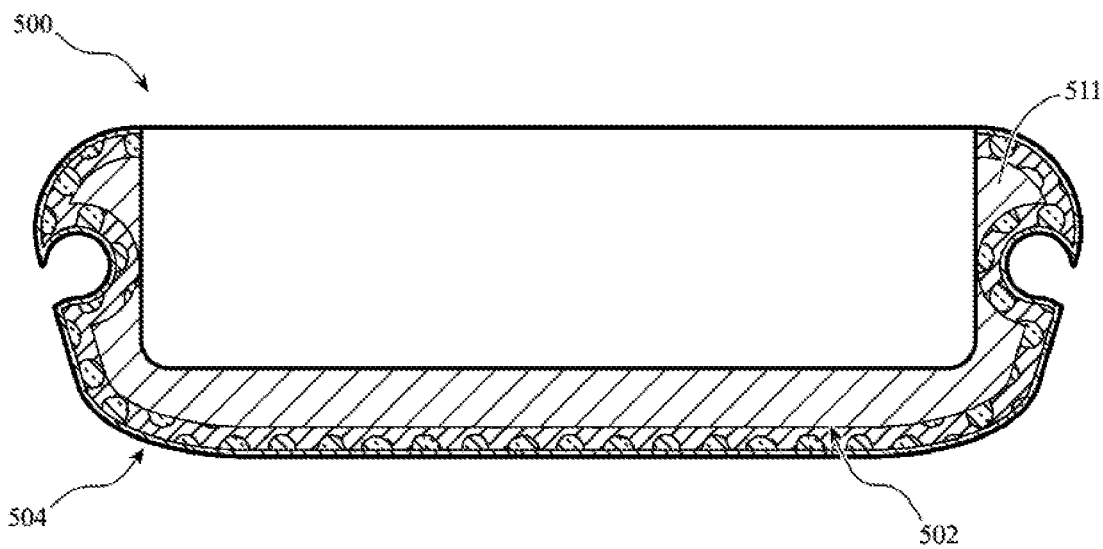
FIG. 10 shows a sectional view of the ceramic composite article of FIG. 9.

Similar to the example ceramic composite article 300 depicted in FIGS. 5-7, and as depicted in FIG. 10, the infill material 504 can, in addition to occupying a portion of the ceramic substrate such as discussed above, completely or substantially completely surround or envelop the ceramic substrate 502. That is, in some embodiments, substantially an entire exterior surface of the ceramic composite article 500 can be the infill material 504. The thickness of the infill material 504 surrounding the ceramic substrate 502 can be designed based on the desired structural or other desired characteristics of the ceramic composite article 500. For example, in some embodiments, the infill material 504 separating a surface of the ceramic substrate 502 from an exterior surface of the ceramic composite article 500 can be between about 1 micron or less and several millimeters or more.

Figure 11:
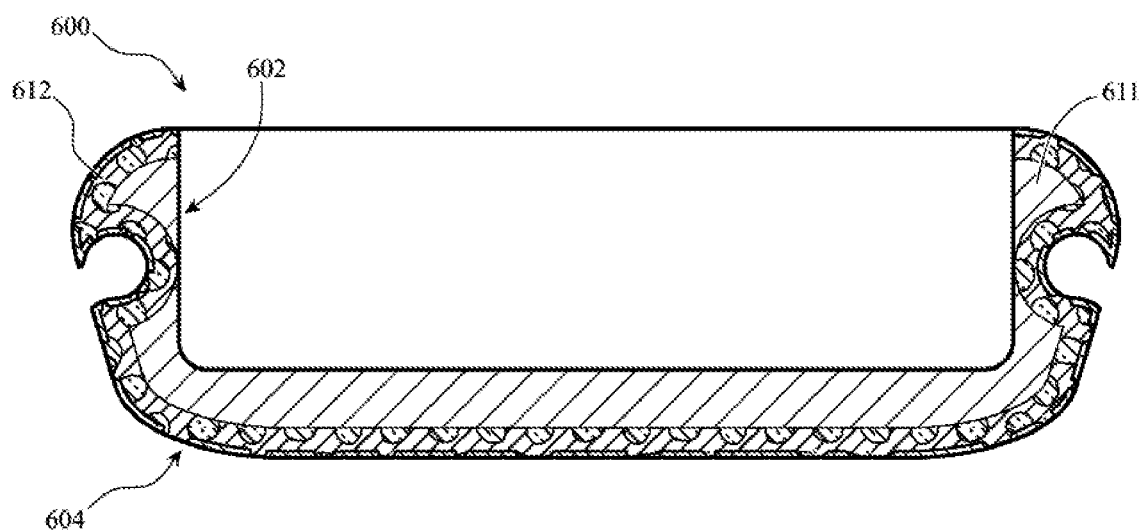
FIG. 11 shows a sectional view of a ceramic composite article.

FIG. 11 shows a sectional view of an exemplary ceramic composite article 600 having an exterior surface 601 that includes both the ceramic substrate 602 and the infill material 604. In this example, the ceramic substrate 602 includes a bulk region 611 and one or more structures 612 similar to the ceramic substrate 502 described with respect to FIGS. 9 and 10. Thus, while the infill material 604 occupies at least a portion of the ceramic substrate 602 (e.g., the interstitial regions of the ceramic matrix), the infill material 604 does not completely surround or envelop the entirety of the ceramic substrate 602. This arrangement of the ceramic composite article 600 can result in an aesthetically pleasing appearance for the user where the exterior surface 601 includes the materials of the ceramic substrate 602 and the infill material 604. Further, the ceramic substrate 602 can have a design that provides for desired structural or other characteristics of the ceramic composite article 600 while providing an aesthetically pleasing exterior surface appearance 601.

The ceramic composite articles discussed herein, including those discussed with reference to FIGS. 1-11, can be formed by any number and manner of processes. In some examples, a ceramic composite article, or a portion thereof, can be formed by processes, such as 3D printing, that allow for the structure of the ceramic composite article to be specifically tailored to achieve any number of desired features and properties.

Figure 12:
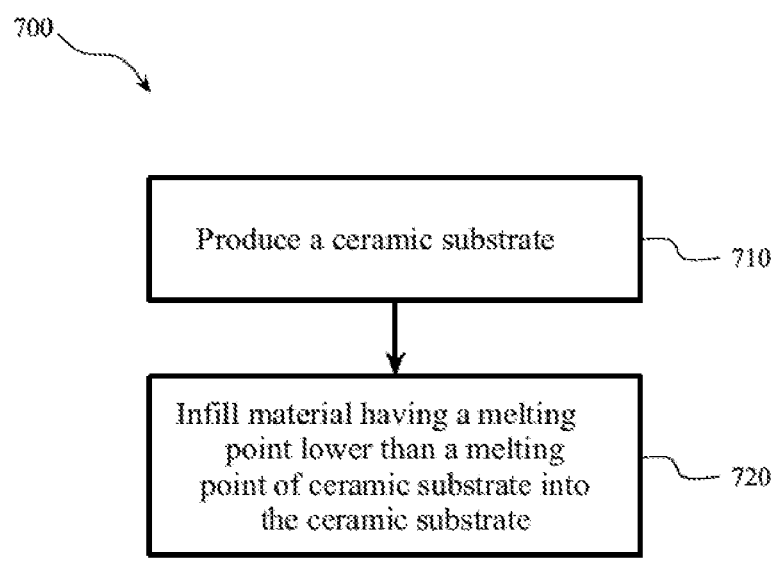
FIG. 12 shows a process flow diagram of a process for forming a ceramic composite article.

FIG. 12 illustrate a process flow diagram of an exemplary process for forming a ceramic composite article as described herein. The process 700 for forming the ceramic composite article includes producing a ceramic substrate at block 710, and infilling a material having a melting point lower than the melting point of the ceramic substrate into one or more fillable structures of the ceramic substrate at block 720 to form the ceramic composite article.

At block 710, the ceramic substrate is produced, for example by forming a green body from a ceramic based slurry and sintering the green body to form the ceramic substrate. The ceramic substrate can be a three-dimensional ceramic substrate that includes one or more fillable structures. The ceramic substrate can be produced by a ceramic 3D printing process, for example any ceramic 3D printing process as known in the art or as may be developed in the future. In some embodiments, the ceramic 3D printing process can include 3D printing a green body with a ceramic-based slurry and sintering the green body to form the ceramic substrate.

Alternatively, or additionally, the ceramic substrate can be produced by molding, machining, other forming methods, or combinations thereof. In some embodiments, the produced ceramic substrate is substantially similar to ceramic substrates 302, 402, 502, and/or 602, as described herein.

At block 720, an infill material is infilled into the ceramic substrate such that the infill material at least partially occupies the ceramic substrate. For example, the infill material can at least partially occupy one or more fillable structures of the ceramic substrate as described herein. In some embodiments, the infill material can at least partially occupy a fillable portion or portions defined by a matrix of ceramic material. The infill material can be a transparent material and has a melting point or glass-liquid transition temperature lower than the melting point of the ceramic substrate.

Infilling the infill material into the ceramic substrate can include providing the infill material to the ceramic substrate in a substantially moldable form and solidifying the moldable material once it has occupied at least a desired portion of the ceramic substrate. In some embodiments, providing the infill material in moldable form can include providing molten infill material to the ceramic substrate such that the molten infill material flows or is otherwise forced into at least a portion of the ceramic substrate. The molten infill material can then be cooled to form the final ceramic composite article. In some embodiments, such an infilling process can include an injection molding or other molding or casting process.

In some embodiments, providing the infill material in moldable form to the ceramic substrate can include providing a powder comprising the infill material to the ceramic substrate. The powder can at least partially occupy the desired portions of the ceramic substrate (e.g., interstitial regions), or can be positioned such that the powder will flow or be forced into the ceramic substrate upon melting. The powder can then be melted to form a molten infill material or to coalesce the powder into a continuation infill material, whereupon it can be cooled once a desired portion of the ceramic substrate has been occupied by the moldable infill material.

Alternatively, for example in some embodiments where the infill material is a polymeric material, the infill material can be provided to the substrate in a substantially liquid or highly viscous form and can then be cured, for example by exposure to a curing agent or electromagnetic radiation, to form the ceramic composite article. In some embodiments, the infill material can be provided as two or more separate infill materials that, when combined or exposed to a curing agent or radiation are cured to form a singular infill material that at least partially occupies the ceramic substrate.

Figure 13:
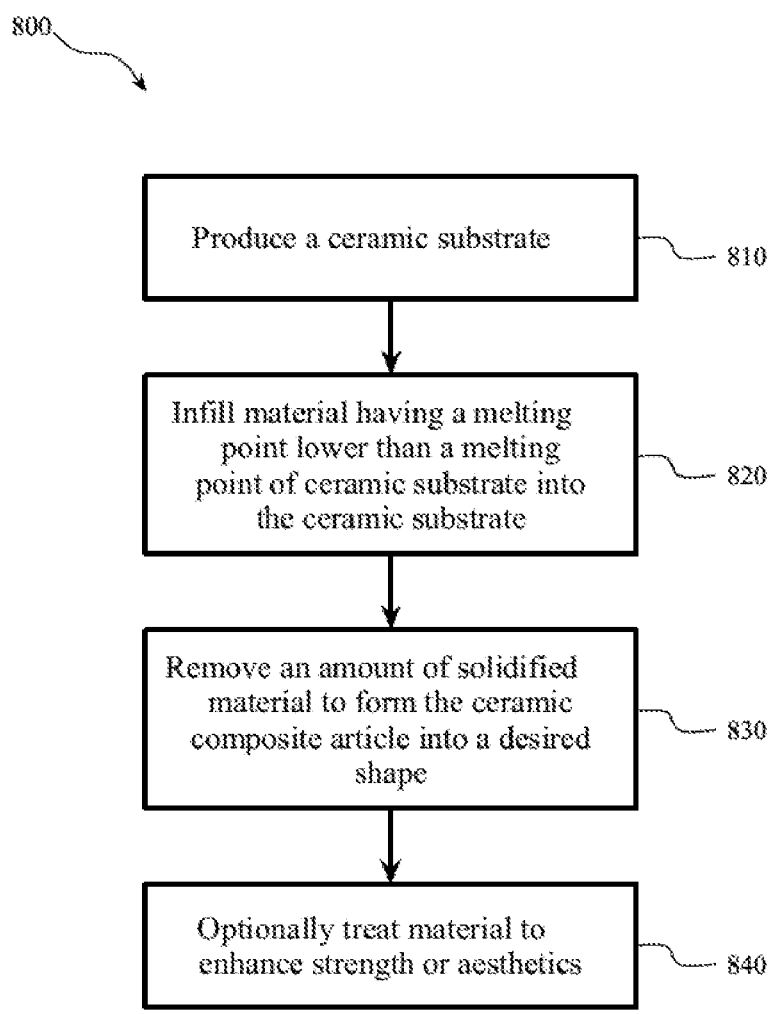
FIG. 13 shows a process flow diagram of a process for forming a ceramic composite article.

FIG. 13 illustrates another process flow diagram of an exemplary process for forming a ceramic composite article as described herein. The process 800 for forming the ceramic composite article includes producing a ceramic substrate at block 810, infilling an infill material having a melting point lower than the melting point of the ceramic substrate into the ceramic substrate at block 820, machining and/or polishing the infilled material and/or ceramic substrate at block 830, and optionally treating the infill material at block 840 to form the ceramic composite article.

At block 810, the ceramic substrate is produced, for example in a manner similar to those described above with respect to block 710 of FIG. 12. The ceramic substrate can be a three-dimensional ceramic substrate that includes one or more fillable structures. The ceramic substrate can be produced by a ceramic 3D printing process, for example any ceramic 3D printing process as known in the art or as may be developed in the future. In some embodiments, the produced ceramic substrate is substantially similar to ceramic substrates 302, 402, 502, and/or 602 as described herein.

At block 820, an infill material is infilled into the ceramic substrate such that the infill material at least partially occupies the ceramic substrate. For example, the infill material can at least partially occupy one or more fillable structures of the ceramic substrate as described herein. The infill material can be a transparent material and has a melting point or glass-liquid transition temperature lower than the melting point of the ceramic substrate. Infilling the infill material at block 820 can be substantially similar to infilling as described above with respect to block 820 of FIG. 12.

At block 830 at least a portion of the solidified infill material can be removed from the ceramic composite article to form the ceramic composite article into a desired shape. For example, solidified material can be removed by machining and/or polishing to achieve a desired shape or surface finish of the ceramic composite article. In some embodiments, block 820 can result in a ceramic substrate that is entirely encased in a relatively large or undesirable amount of infill material. For example, a thickness of the infill material surrounding the ceramic substrate can be larger than desired in the final ceramic composite article. Accordingly, the infill material can be machined, etched, ground, or otherwise processed to remove a desired amount of infill material and/or form a final shape or geometry of the ceramic composite article.

In some cases, block 830 can include removing enough infill material to expose at least a portion of the ceramic substrate to produce a ceramic composite article similar to ceramic composite articles 400 and 600 described herein. Block 830 can further include polishing an exterior surface of the ceramic composite article to achieve a desired surface finish, for example a highly smooth surface finish that can be aesthetically pleasing to a user.

At block 840 the infill material can be optionally treated. This optional treatment can include any number of treatment processes. In some embodiments, for example where the infill material includes glass, the treatment can be a chemical strengthening treatment. The chemical strengthening treatment can include submerging the ceramic composite article in a chemical bath. In some embodiments, the treatment can include tempering or otherwise heat treating all or a portion of the ceramic composite article. In some embodiments, the treatment can include a colorizing treatment, whereupon a color, colors, or a design can be formed on or into the infill material of the ceramic composite article.

The process flows discussed herein can be used to form ceramic composite articles including any shape or design, as desired. Certain steps or stages of such example processes flows will now be illustrated with respect to a ceramic composite article that can be used as a housing for an electronic device. While one example design of a ceramic composite article is illustrated in FIGS. 14-16, the depicted process steps or stages can be used to form a ceramic composite article including any desired shape or design.

Figure 14:
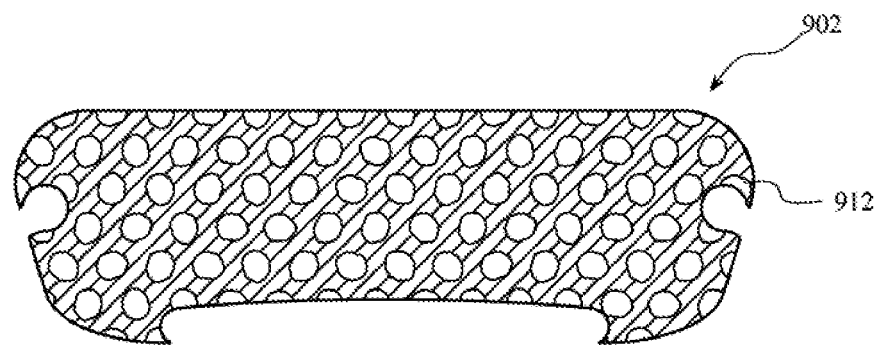
FIG. 14 shows a sectional view of a ceramic substrate.

FIG. 14 shows a sectional view of an exemplary ceramic substrate 902, for example as produced at block 710 or 810 as described above with respect to FIGS. 12 and 13. The ceramic substrate 902 can be substantially similar to the ceramic substrate 302, 402, 502, and/or 602 as described herein. As can be seen in FIG. 14, the ceramic substrate 902 includes a number of fillable structures in the form of interstices that are to be filled with a material having a melting point or glass-liquid transition temperature lower than the melting point of the ceramic substrate 902. The fillable structures can be any shape or size. Further, in some cases, the fillable structures can include any number of different shapes and sizes.

Figure 15:
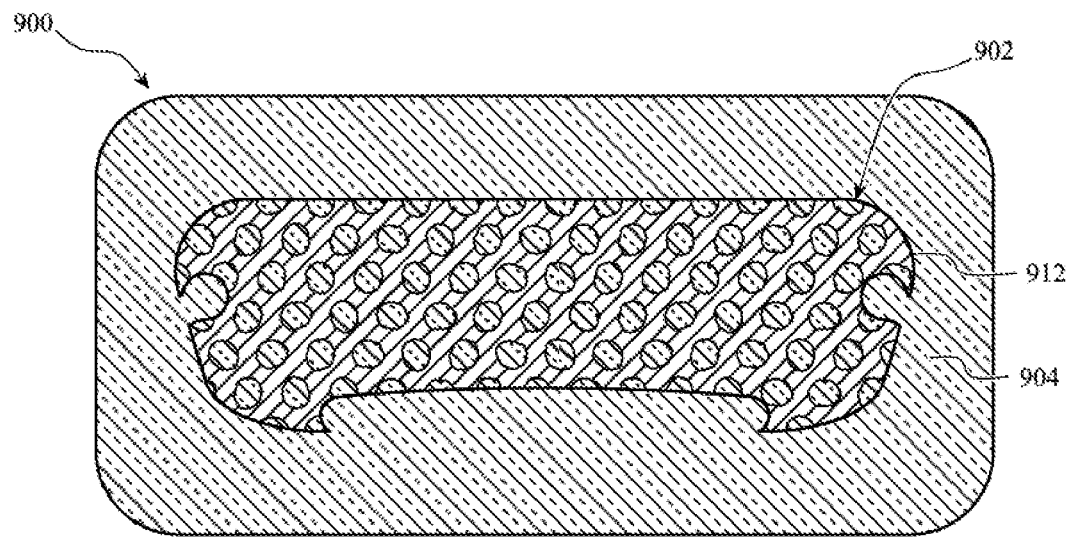
FIG. 15 shows a sectional view of a stage of a process for forming a ceramic composite article.

FIG. 15 shows a sectional view of a stage of an exemplary process for forming a ceramic composite article 900, for example after block 720 or 820 of processes 700 or 800 have been performed as described above with respect to FIGS. 12 and 13. In the depicted example, the intermediate stage of ceramic composite article 900 includes infill material disposed within the fillable structures 912, as well as a substantial amount of material 904 that will be removed to form the final shape of the ceramic composite article 900. The removal of the infill material 904 can occur, for example, as described with respect to block 830 of process flow 800. In some cases, the same infill material can occupy the fillable structures 912. In some other cases, however, one or more different infill materials can occupy fillable structures 912. For example, a first infill material can occupy a first portion of fillable structures 912 and a second, different infill material can occupy a second, different portion of fillable structures 912.

Figure 16:
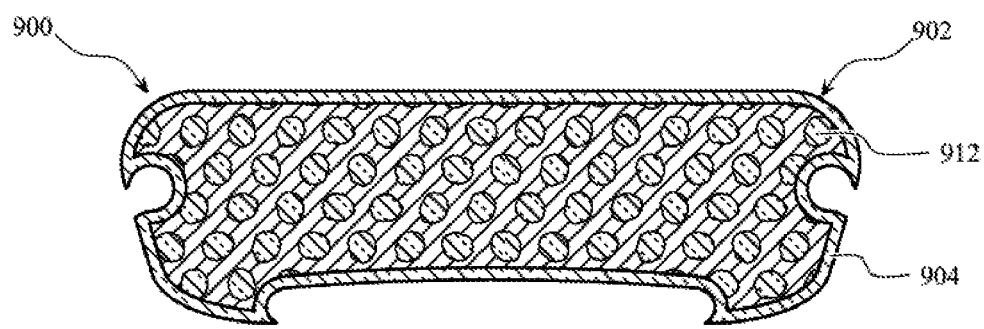
FIG. 16 shows a sectional view of a ceramic composite article.

FIG. 16 shows a sectional view of the formed exemplary ceramic composite article 900 after excess material 904 has been removed, for example by machining. As can be seen, the ceramic composite article 900 has a desired final form that can be used as, for example, a housing for an electronic device. Further, the infill material 904 can be seen to substantially entirely fill the fillable structures 912 of the ceramic substrate 902, while the transparent nature of the infill material 904 allows for visualization of the ceramic substrate through the transparent material 904 remaining on the external surface of the ceramic substrate. The formed ceramic composite article 900 can be substantially similar to the ceramic composite articles 300, 400, 500, and 600 as described herein.

Any of the features or aspects of the ceramic composite articles discussed herein can be combined or included in any varied combination. For example, the design and shape of the ceramic substrate is not limited in any way and can be formed by any number of processes, including those discussed herein. Further, the infill material can be provided into the one or more fillable structures of the ceramic substrate at any time, even during formation of the substrate, and by any number of processes, including those discussed herein. A ceramic composite article, as discussed herein, can be or can form all or a portion of a component, such as a housing, for an electronic device. The ceramic composite article can also be or form any number of additional components of an electronic device, including internal components, external components, and the like.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent that many modifications and variations are possible in view of the above teachings.

What is claimed is:

1. A ceramic composite housing of an electronic device, comprising:
    a substrate including a matrix of ceramic material defining a network of interstitial regions, the interstitial regions in fluid communication with each other within the matrix; and
    a transparent material occupying at least some of the interstitial regions of the substrate, the transparent material having a melting point lower than a melting point of the ceramic material.

2. The ceramic composite housing of claim 1, wherein:
    the substrate includes a repeating three-dimensional pattern defining the network of interstitial regions;
    the three-dimensional pattern extends across a height, width, and depth of the housing; and
    the transparent material comprises glass and at least partially fills the network of interstitial regions such that the ceramic composite housing is a solid body.

3. The ceramic composite housing of claim 1, wherein the substrate extends across one or more of an entire height, width, or depth of the housing.

4. The ceramic composite housing of claim 1, wherein the transparent material completely surrounds the substrate.

5. The ceramic composite housing of claim 1, wherein an exterior surface of the ceramic composite housing comprises the matrix of ceramic material and the transparent material.

6. The ceramic composite housing of claim 1, wherein the substrate comprises one or more of zirconia or alumina.

7. The ceramic composite housing of claim 1, wherein the transparent material comprises an amorphous material or a polymer material.

8. The ceramic composite housing of claim 1, wherein a coefficient of thermal expansion of the ceramic material is within about 10% of a coefficient of thermal expansion of the transparent material.

9. The ceramic composite housing of claim 1, wherein the melting point of the transparent material is more than about 100° C. lower than the melting point of the ceramic material.

10. A ceramic composite article of an electronic device, comprising:
    a substrate including a matrix of ceramic material; and
    an infill material occupying at least a portion of the matrix of ceramic material, the matrix comprising a network of voids connected with each other within the matrix and the infill material having a melting point lower than a melting point of the ceramic material.

11. The ceramic composite article of claim 10, wherein the substrate comprises a 3D printed ceramic form.

12. The ceramic composite article of claim 10, wherein the infill material is transparent.

13. The ceramic composite article of claim 10, wherein the portion of the matrix of ceramic material occupied by the infill material includes one or more apertures, cavities, interstices, or recesses defined by the matrix of ceramic material.

14. A method for forming a ceramic composite article of an electronic device, comprising infilling a transparent material into a network of interstitial regions defined by a substrate including a matrix of ceramic material, the interstitial regions in fluid communication with each other within the matrix, the transparent material having a melting point lower than a melting point of the ceramic material.

15. The method of claim 14, further comprising 3D printing the matrix of ceramic material.

16. The method of claim 15, wherein 3D printing the matrix of ceramic material includes 3D printing a green body with a ceramic-based slurry and sintering the green body.

17. The method of claim 14, wherein infilling the transparent material includes providing the transparent material in a moldable form into the network of interstitial regions; and
    solidifying the moldable transparent material.

18. The method of claim 17, wherein providing the transparent material in a moldable form includes providing molten transparent material into the network of interstitial regions; and
    solidifying the moldable transparent material includes cooling the molten transparent material.

19. The method of claim 17, wherein providing the transparent material in a moldable form includes providing a powder comprising the transparent material into the network of interstitial regions defined by the matrix of ceramic material and melting the powder; and
    solidifying the moldable transparent material includes cooling the molten transparent material.

20. The method of claim 17, wherein solidifying the moldable transparent material includes curing the moldable transparent material.

* * * * *